(12) United States Patent
Lin et al.

(10) Patent No.: US 12,199,433 B2
(45) Date of Patent: Jan. 14, 2025

(54) POWER SUPPLY DEVICE, ENERGY MANAGEMENT SYSTEM, AND POWER SYSTEM

(71) Applicant: KABUSHIKI KAISHA TOSHIBA, Tokyo (JP)

(72) Inventors: Qiang Lin, Kawasaki Kanagawa (JP); Tetsu Shijo, Tokyo (JP); Kenichirou Ogawa, Kawasaki Kanagawa (JP); Yasuhiro Kanekiyo, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 25 days.

(21) Appl. No.: 18/175,564

(22) Filed: Feb. 28, 2023

(65) Prior Publication Data

US 2024/0039285 A1    Feb. 1, 2024

(30) Foreign Application Priority Data

Jul. 26, 2022 (JP) ................. 2022-118806

(51) Int. Cl.
*H02J 3/24* (2006.01)
*H02M 7/537* (2006.01)

(52) U.S. Cl.
CPC ............... *H02J 3/24* (2013.01); *H02M 7/537* (2013.01)

(58) Field of Classification Search
CPC ........................................................ H02J 3/24
See application file for complete search history.

(56) References Cited

U.S. PATENT DOCUMENTS

| | | | |
|---|---|---|---|
| 10,784,686 B2* | 9/2020 | Schneider | H02J 3/241 |
| 11,368,114 B2* | 6/2022 | Huang | H02P 9/105 |
| 2010/0191996 A1 | 7/2010 | Iino et al. | |
| 2015/0015075 A1* | 1/2015 | Toya | H02J 7/02 320/112 |
| 2016/0043555 A1* | 2/2016 | Howell | H02J 7/0068 307/23 |
| 2021/0296883 A1 | 9/2021 | Yin | |
| 2023/0006442 A1 | 1/2023 | Kudo | |
| 2023/0387684 A1* | 11/2023 | Hall | H02J 3/004 |
| 2023/0387692 A1* | 11/2023 | Inoue | H02M 7/48 |
| 2024/0055975 A1* | 2/2024 | Inoue | H02J 3/32 |

FOREIGN PATENT DOCUMENTS

| | | |
|---|---|---|
| JP | 2010178468 A | 8/2010 |
| JP | 2020010590 A | 1/2020 |
| JP | 2020078162 A | 5/2020 |
| JP | 6735039 B1 | 7/2020 |
| JP | 2021151081 A | 9/2021 |
| WO | 2012124370 A1 | 9/2012 |
| WO | 2021131576 A1 | 7/2021 |

* cited by examiner

*Primary Examiner* — Jared Fureman
*Assistant Examiner* — Esayas G Yeshaw
(74) *Attorney, Agent, or Firm* — Holtz, Holtz & Volek PC

(57) ABSTRACT

According to one embodiment, a power supply device connected to a power grid is provided. The power supply device includes an inverter, a control unit configured to control operation of the inverter using a first parameter value so as to simulate characteristics of a synchronous generator, and an acquisition unit configured to obtain a second parameter value different from the first parameter value. The control unit is configured to control the operation of the inverter by changing the first parameter value to the acquired second parameter value.

12 Claims, 6 Drawing Sheets

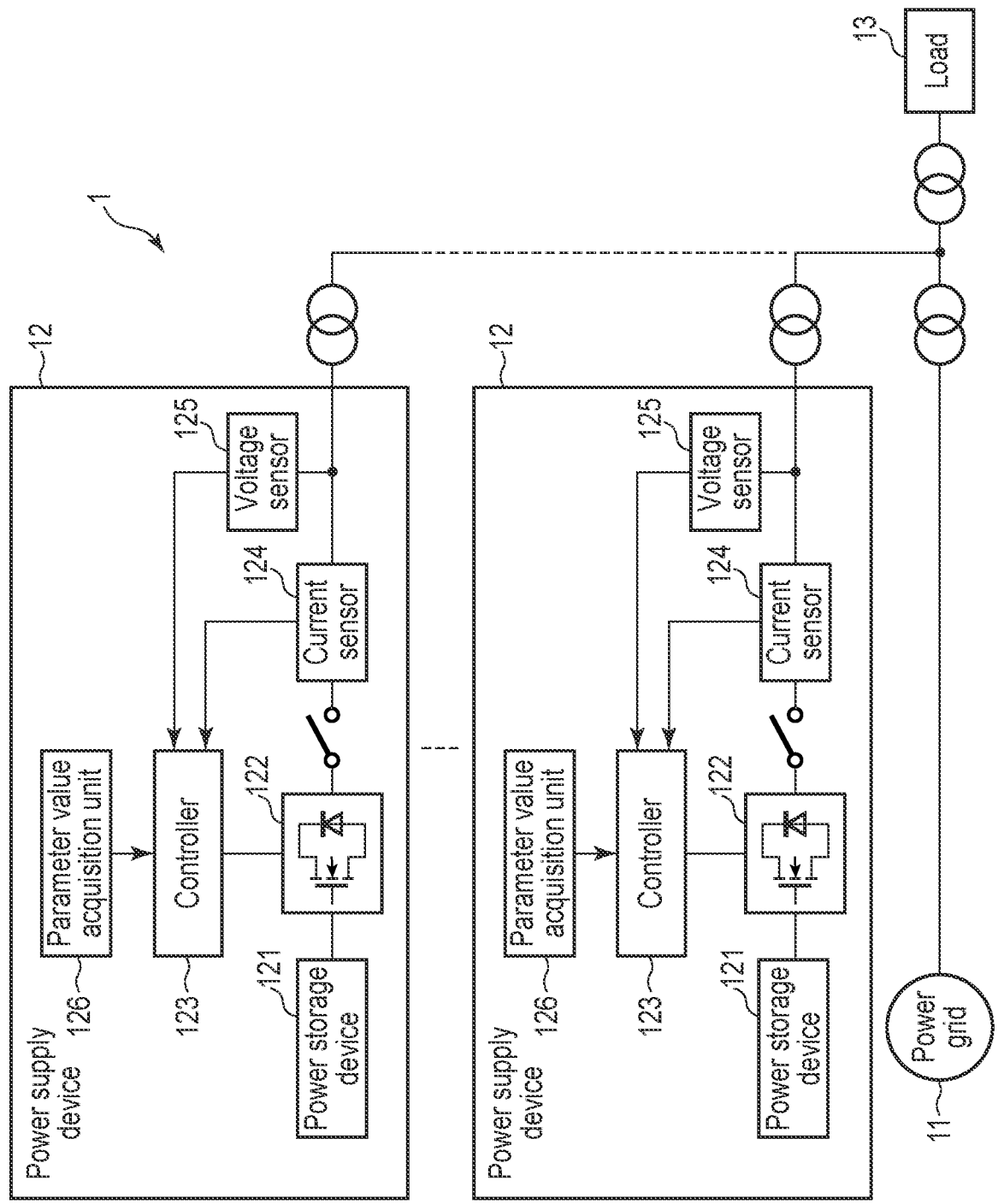
F I G. 1

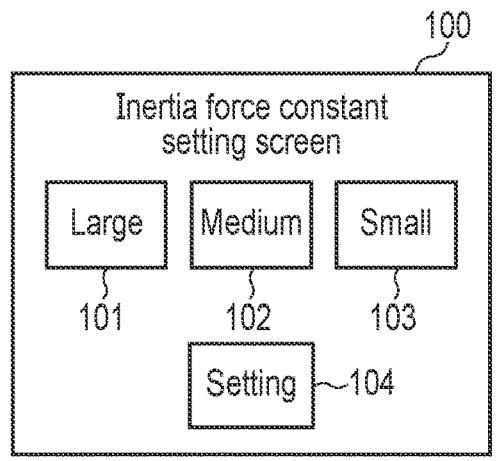
FIG. 2
Inertia force constant table
| | |
|---|---|
| Large | Inertia force constant 1 |
| Medium | Inertia force constant 2 |
| Small | Inertia force constant 3 |
FIG. 3
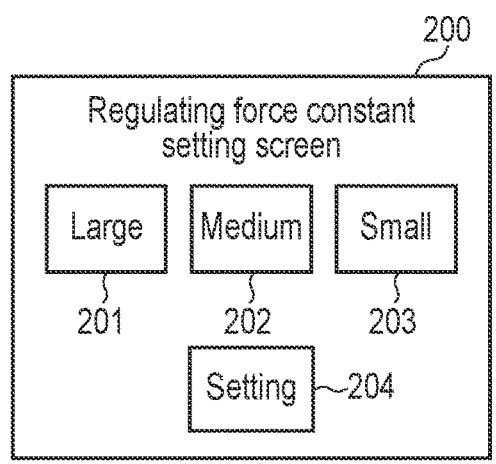
FIG. 4

F.I.G. 8

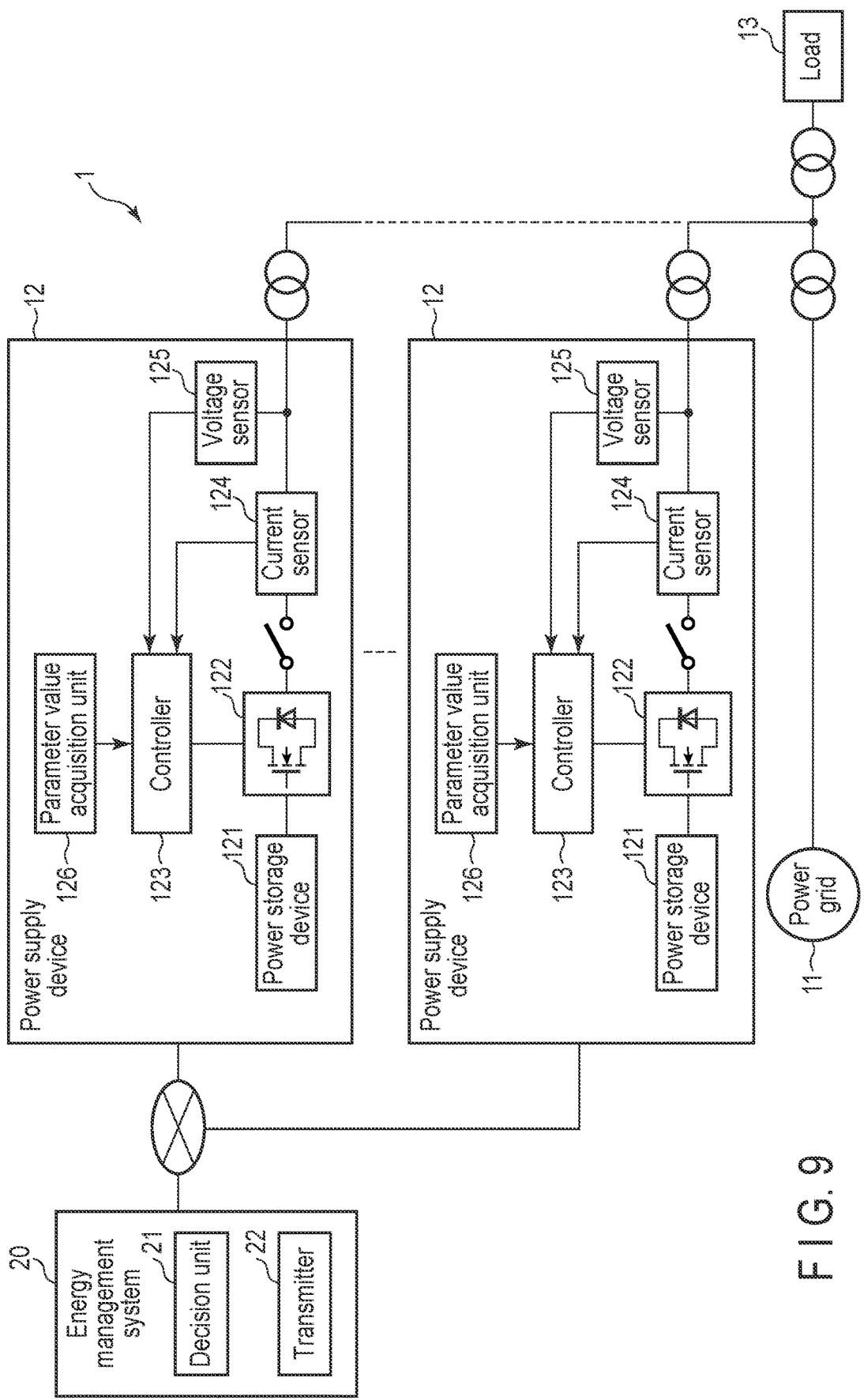
F I G. 9

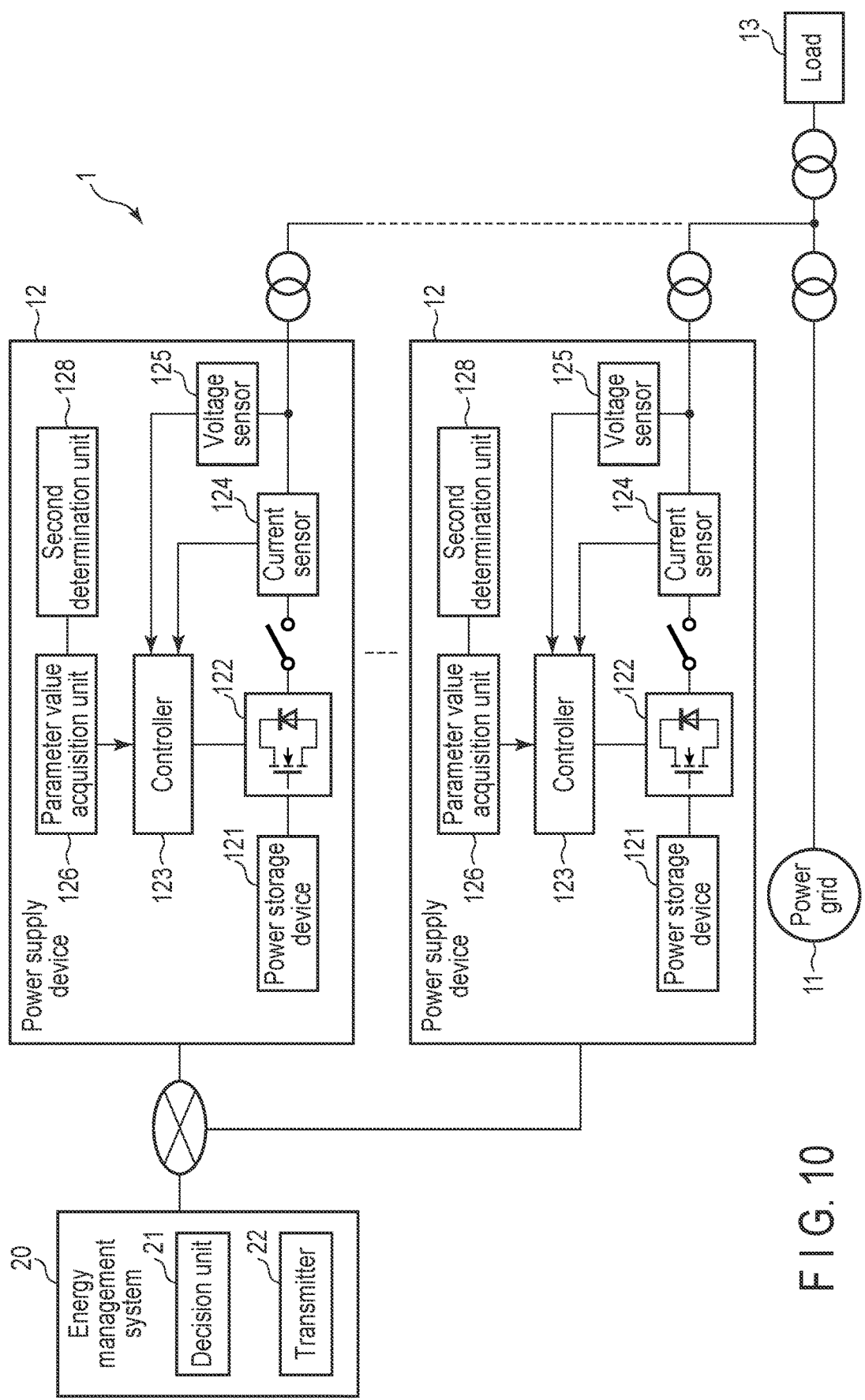
F I G. 10

POWER SUPPLY DEVICE, ENERGY MANAGEMENT SYSTEM, AND POWER SYSTEM

CROSS-REFERENCE TO RELATED APPLICATIONS

This application is based upon and claims the benefit of priority from Japanese Patent Application No. 2022-118806, filed Jul. 26, 2022, the entire contents of which are incorporated herein by reference.

FIELD

Embodiments described herein relate generally to power supply devices, energy management systems, and power systems.

BACKGROUND

In order to realize a low-carbon society, power supply devices that supply power converted from renewable energy (hereinafter referred to as renewable energy power sources) are being introduced into power grids in Japan and abroad, replacing thermal power generation that relies on fossil fuels. Note that many of such renewable energy power sources are interconnected with a power grid with an alternating current through a current control inverter (hereinafter simply referred to as an inverter). Compared to synchronous generators used in thermal power generation described above, inverters have the advantage of faster response.

By the way, synchronous generators have a rotating body (rotor) and can suppress fluctuations in the grid frequency by inertia force of the rotating body (i.e., improve stability of power supply). However, inverters, unlike synchronous generators, do not have inertia (and damping force) because they are configured by switching elements (i.e., they do not have a rotating body). Therefore, there is concern that the stability of the power supply may decrease as the ratio of renewable energy power sources in the entire power grid increases.

Therefore, in recent years, it has been considered to suppress the decline in stability of power supply by applying virtual synchronous inverter control technology, which controls the operation of an inverter to simulate the characteristics of a synchronous generator (a real-world generator), to renewable energy power sources. Note that, according to the virtual synchronous inverter control technology, an operation of the inverter is controlled based on parameter values such as an inertia constant to simulate the inertia force of the synchronous generator and a regulating force constant to simulate a regulating power for the fluctuating grid frequency, as described above.

However, since the parameter values are fixed during operation of renewable energy power sources, control based on such parameter values may not be able to maintain the stability of power supply in the event where disturbances such as sudden load changes occur.

BRIEF DESCRIPTION OF THE DRAWINGS

FIG. 1 shows an example of a configuration of a power system according to an embodiment.
FIG. 2 shows an example of an inertia force constant setting screen.
FIG. 3 shows an example of an inertia force constant table.
FIG. 4 shows an example of a regulating force constant setting screen.
FIG. 9 illustrates a second modified example of the present embodiment.
FIG. 10 illustrates a third modified example of the present embodiment.

DETAILED DESCRIPTION

Figure 5:
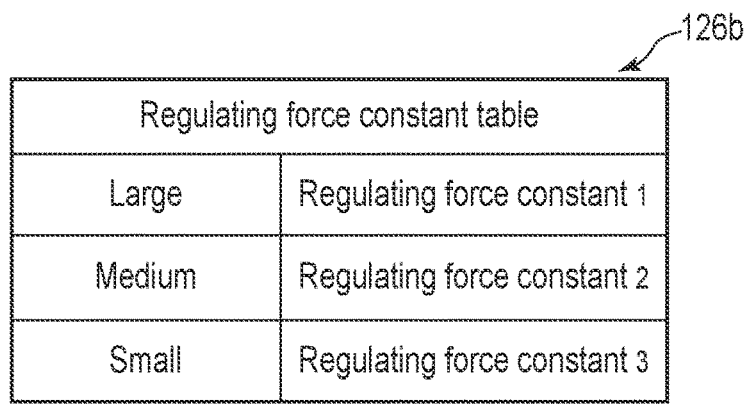
FIG. 5 shows an example of a regulating force constant table.

In general, according to one embodiment, a power supply device connected to a power grid is provided. The power supply device includes an inverter, a control unit configured to control operation of the inverter using a first parameter value so as to simulate characteristics of a synchronous generator, and an acquisition unit configured to obtain a second parameter value different from the first parameter value. The control unit is configured to control the operation of the inverter by changing the first parameter value to the acquired second parameter value.

Various embodiments will be described with reference to the accompanying drawings.

FIG. 1 shows an example of a configuration of a power system according to the present embodiment. As shown in FIG. 1, a power system 1 is configured by a power grid 11, a plurality of power supply devices 12, and a load 13, etc.

The plurality of power supply devices 12 are connected to the power grid 11. Each of the plurality of power supply devices 12 corresponds to a renewable energy power source that includes a power conditioning system (PCS) and operates to convert power converted from renewable energy such as solar power (power obtained by power generation using renewable energy) from a direct current to an alternating current for output.

Note that, in FIG. 1, a plurality of power supply devices 12 are shown, but the number of power supply devices 12 may be one, for example.

The load 13 includes, for example, consumer devices (load devices) that consume power in homes, schools, factories, and businesses and the like. The power (AC power) output from each of the plurality of power supply devices 12 is supplied to the load 13 via a transformer as described above. Note that the load 13 may be configured by a plurality of consumer devices. The load 13 may also include, for example, a power storage device that stores surplus power in the power grid 11.

In the power system 1 described above, the plurality of power supply devices 12 and the load 13, etc., are connected to the power grid 11 via a switchgear not shown. In the present embodiment, the plurality of power supply devices 12 can be considered to be connected to a partial grid (microgrid) that is part of a power distribution network of the power grid 11; however, in a case where an abnormality occurs in the power grid 11 due to an accident or disaster, for example, the switchgear of the power grid 11 becomes opened, and the partial grid becomes electrically separated from the power grid 11, thereby becoming off-grid. In this case, the power supply from the power grid 11 is stopped (cut off), and the partial grid functions as a distributed power supply system that can operate independently using the power output from each of the multiple power supply devices 12.

On the other hand, in a case where there is no abnormality in the power grid 11, the above-mentioned switchgear is closed, and the power output from each of the plurality of power supply devices 12, for example, is supplied to the power grid 11.

The following is a description of the power supply devices 12 according to the present embodiment. As shown in FIG. 1, a power supply device 12 includes a power storage device 121, an inverter (voltage inverter) 122, a controller 123, a current sensor 124, and a voltage sensor 125.

The power storage device 121 includes a storage battery that can be charged and discharged, and is configured to store power generated using renewable energy, for example, as described above, and to release the stored power.

Here, the power converted from renewable energy (i.e., the power stored in the power storage device 121) is a direct current, and the inverter 122 operates to convert the power from the direct current to an alternating current for output. The inverter 122 corresponds to the power conditioning system described above.

The controller 123 controls charging and discharging operations in the power supply device 12 (the power storage device 121). The controller 123 also controls the operation of the inverter 122 to simulate the characteristics of a synchronous generator including a rotor (rotational energy) using virtual synchronous inverter control technology (i.e., virtual synchronous inverter control is executed with respect to the inverter 122). In other words, the power supply device 12 according to the present embodiment is a virtual synchronous inverter (device). Note that the controller 123 is realized by a processor including, for example, a microcomputer.

The current sensor 124 is connected to the inverter 122 via an electromagnetic contactor (MC), for example, and detects (measures) an output current of the inverter 122. The voltage sensor 125 also detects (measures) an output voltage of the inverter 122. The output current detected by the current sensor 124 and the output voltage detected by the voltage sensor 125 (i.e., information from the current sensor 124 and the voltage sensor 125) are used for the virtual synchronous inverter control described above.

Here, the virtual synchronous inverter control described above is executed based on parameter values, which include an inertia force constant to simulate the inertia force of the synchronous generator and a regulating force constant (droop rate) to simulate a regulating power with respect to a fluctuating grid frequency, etc. According to the virtual synchronous inverter control, the inertia force and regulating power similar to those of the synchronous generator can be realized in the power supply device 12 to suppress fluctuations in the grid frequency (i.e., to improve the stability of the power supply).

However, the parameter values used for the virtual synchronous inverter control described above are often fixed, and in a case where, for example, the amount of power demanded by the load 13 (i.e., the load on each of the plurality of power supply devices 12) changes suddenly, the virtual synchronous inverter control using such fixed parameter values may not be able to maintain a stable power supply.

In order to maintain a stable power supply, it is necessary to stabilize the grid frequency, which fluctuates in cases where disturbances such as the sudden load changes mentioned above occur, as soon as possible. However, the time required to stabilize the grid frequency largely depends on the above parameter values (inertia force constant and regulating force constant).

In this case, in order to stabilize the grid frequency in a short time, it may be considered, for example, to execute a control that keeps increasing the above inertia force constant; however, in such a configuration, the burden on the power supply device 12 (virtual synchronous inverter device) becomes large, and the operation of the power supply device 12 (the inverter 122 provided in the power supply device 12) may stop. In other words, as a result, it may not be possible to maintain the stability of the power supply.

Therefore, the power supply device 12 of the present embodiment has a configuration that enables adjustment of the parameter values (e.g., the inertia force constant and the regulating force constant) used for the virtual synchronous inverter control described above in order to appropriately control the grid frequency to an extent that the operation of the power supply device 12 does not stop. Note that, in the present embodiment, "adjustment of the parameter values" includes changing the parameter values used in the virtual synchronous inverter control (hereinafter referred to as first parameter values) to new parameter values (hereinafter referred to as second parameter values) (i.e., newly setting the second parameter values as the first parameter values).

Specifically, as shown in FIG. 1, the power supply device 12 includes a parameter value acquisition unit 126, which acquires, for example, a second parameter value specified by a grid operator.

Note that it is assumed that the power supply device 12 has a housing, for example, and a control panel device is mounted on the housing. This control panel device is assumed, for example, as having a function of acquiring and displaying information (e.g., voltage, current, power, frequency, inertia, droop rate, temperature) relating to an operational status of the power supply device 12, as well as a function of an interface for the grid operator to specify the second parameter value as described above.

In this case, the control panel device displays, for example, a screen for setting the inertia force constant as the second parameter value (hereinafter referred to as an inertia force constant setting screen) and a screen for setting the regulating force constant as the second parameter value (hereinafter referred to as a regulating force constant setting screen).

FIG. 2 shows an example of the inertia force constant setting screen. As shown in FIG. 2, an inertia force constant setting screen 100 is provided with a "large" button 101, a "medium" button 102, a "small" button 103, and a "setting" button 104.

The grid operator can perform the operation of pressing (specifying) one of the buttons 101 to 103 on the inertia force constant setting screen 100 as shown in FIG. 2, and then pressing the "setting" button 104. This allows the grid operator to specify an inertia force constant corresponding to the button that was specified (selected) when the "setting" button 104 was pressed as the second parameter value.

The parameter value acquisition unit 126 described above acquires the inertia force constant as the second parameter value based on the button specified on the inertia force constant setting screen 100 displayed on such a control panel device (that is, the operation of the grid operator on the inertia force constant setting screen 100).

Note that the parameter value acquisition unit 126 is considered to include an inertia force constant table 126a as shown in FIG. 3. As shown in FIG. 3, the inertia force constant table 126a holds a plurality of inertia force constants (i.e., second parameter values) corresponding to the button types "large", "medium", and "small" provided on the inertia force constant setting screen 100 described above. Specifically, inertia force constant table 126a holds "inertia force constant 1" corresponding to "large", "inertia force constant 2" corresponding to "medium", and "inertia force constant 3" corresponding to "small".

The parameter value acquisition unit 126 can acquire inertia force constants by referring to such an inertia force constant table 126a. For example, in the case where the "large" button 101 is specified (selected) on the inertia force constant setting screen 100, the parameter value acquisition unit 126 acquires "inertia force constant 1". In the case where the "medium" button 102 is specified (selected) on the inertia force constant setting screen 100, the parameter value acquisition unit 126 acquires "inertia force constant 2". In the case where the "small" button 103 is specified (selected) on the inertia force constant setting screen 100, the parameter value acquisition unit 126 acquires "inertia force constant 3".

Note that the "inertia force constant 1" is the inertia force constant corresponding to the "large" button 101 and is considered to be a larger value than the "inertia force constant 2" and the "inertia force constant 3". On the other hand, the "inertia force constant 2" is the inertia force constant corresponding to the "medium" button 102 and is considered to be a smaller value than the "inertia force constant 1" and a larger value than the "inertia force constant 3". Furthermore, the "inertia force constant 3" is the inertia force constant corresponding to the "small" button 103 and is considered to be a smaller value than the "inertia force constant 1" and the "inertia force constant 2".

In the case where the inertia force constant as the second parameter value is acquired by the parameter value acquisition unit 126 as described above, the controller 123 changes the inertia force constant used in the virtual synchronous inverter control as the first parameter value described above to the inertia force constant acquired by the parameter value acquisition unit 126. In this case, the virtual synchronous inverter control using the changed inertia force constant is executed.

Here, the case of adjusting the inertia force constant used in the virtual synchronous inverter control is described; however, the regulating force constant is also adjusted in the same manner.

FIG. 4 shows an example of the regulating force constant setting screen. As shown in FIG. 4, a regulating force constant setting screen 200 is provided with a "large" button 201, a "medium" button 202, a "small" button 203, and a "setting" button 204.

The grid operator can perform the operation of pressing (specifying) one of the buttons 201 to 203 on the regulating force constant setting screen 200 as shown in FIG. 4, and then pressing the "setting" button 204. This allows the grid operator to specify the regulating force constant corresponding to the button that was specified (selected) when the "setting" button 204 was pressed as the second parameter value.

The parameter value acquisition unit 126 described above acquires the regulating force constant as the second parameter value based on the button specified on the regulating force constant setting screen 200 displayed on such a control panel device (that is, the operation of the grid operator on the regulating force constant setting screen 200).

Note that the parameter value acquisition unit 126 is considered to include a regulating force constant table 126b as shown in FIG. 5. As shown in FIG. 5, the regulating force constant table 126b holds a plurality of regulating force constants (i.e., second parameter values) corresponding to the button types "large", "medium", and "small" provided on the regulating force constant setting screen 200 described above. Specifically, the regulating force constant table 126b holds "regulating force constant 1" corresponding to "large", "regulating force constant 2" corresponding to "medium", and "regulating force constant 3" corresponding to "small".

The parameter value acquisition unit 126 can acquire the regulating force constants by referring to such a regulating force constant table 126b. For example, in the case where the "large" button 201 is specified (selected) on the regulating force constant setting screen 200, the parameter value acquisition unit 126 acquires "regulating force constant 1". In the case where the "medium" button 202 is specified (selected) on the regulating force constant setting screen 200, the parameter value acquisition unit 126 acquires "regulating force constant 2". In the case where the "small" button 203 is specified (selected) on the regulating force constant setting screen 200, the parameter value acquisition unit 126 acquires "regulating force constant 3".

Note that the "regulating force constant 1" is the regulating force constant corresponding to the "large" button 201 and is considered to be a larger value than the "regulating force constant 2" and the "regulating force constant 3". On the other hand, "regulating force constant 2" is the regulating force constant corresponding to the "medium" button 202 and is considered to be a smaller value than the "regulating force constant 1" and a larger value than the "regulating force constant 3". Furthermore, the "regulating force constant 3" is the regulating force constant corresponding to the "small" button 203 and is considered to be a smaller value than the "regulating force constant 1" and the "regulating force constant 2".

In the case where the regulating force constant as the second parameter value is acquired by the parameter value acquisition unit 126 as described above, the controller 123 changes the regulating force constant used in the virtual synchronous inverter control as the first parameter value described above to the regulating force constant acquired by the parameter value acquisition unit 126. In this case, the virtual synchronous inverter control using the changed regulating force constant is executed.

Note that, although the present embodiment describes adjusting the inertia force constant and the regulating force constant, as long as the parameter values used in the virtual synchronous inverter control are changed, the present embodiment may be configured to change only one of the inertia force constant and the regulating force constant.

In the following, for convenience of explanation, the inertia force constant and the regulating force constant as the first parameter values described above are simply referred to as the first parameter value, and the inertia force constant and the regulating force constant as the second parameter values are simply referred to as the second parameter value. Similarly, the inertia force constant setting screen and the regulating force constant setting screen are referred to as a parameter value setting screen, and the inertia force constant table and the regulating force constant table are referred to as a parameter value table.

Note that, in the present embodiment, it is explained that the second parameter value corresponding to a button that is specified (selected) by the grid operator from among one of the "large" button, "medium" button, and "small" button presented on the parameter value setting screen is acquired.

However, the parameter value setting screen may be designed to directly present (display) a plurality of second parameter values held in the parameter value table. In this case, the parameter value acquisition unit 126 should acquire the second parameter values specified (selected) on the parameter value setting screen.

The above parameter value setting screens (the inertia force constant setting screen 100 shown in FIG. 2 and the regulating force constant setting screen 200 shown in FIG. 4) are examples, and the grid operator may specify the second parameter value via a different form of interface.

As described above, the power supply device 12 of the present embodiment includes a controller 123 that controls the operation of the inverter 122 using the first parameter value to simulate the characteristics of a synchronous generator (executes virtual synchronous inverter control), and a parameter value acquisition unit 126 that acquires a second parameter value that is different from the first parameter value, in which the controller 123 controls the operation of the inverter 122 by changing the first parameter value (default parameter value) to the second parameter value acquired by the parameter value acquisition unit 126.

In the present embodiment, the above configuration allows the stability of the power supply to improve.

Here, in the event of an abnormality in the power grid 11 due to, for example, an accident or disaster, the partial grid transitions from the on-grid (i.e., an environment in which the power supply device 12 is operated on-grid), where the partial grid is connected to the power grid 11, to the off-grid (i.e., an environment in which the power supply device 12 is operated off-grid), where the partial grid is not connected to the power grid 11. In the off-grid, load fluctuations with respect to the power supply capacity are expected to be large, and the grid frequency is expected to fluctuate significantly. However, in the present embodiment, by adopting a configuration in which the second parameter values specified manually by the grid operator are acquired and the virtual synchronous inverter control is executed using the second parameter values, even under such a situation of transition from the on-grid to the off-grid, it is possible to realize flexible adjustment of the parameter values in the virtual synchronous inverter control and improve the stability of power supply. Thermal power generation and hydroelectric power generation convert the kinetic energy of fluids into rotational motion via turbines, and synchronous generators convert the rotational motion into electrical energy. Note that, since the size of the turbine in a synchronous generator is fixed and the inertia force in the synchronous generator cannot be physically changed, the ability to change the parameter value (inertia force constant) to simulate the inertia force is one of the advantageous effects on the synchronous generator. In the on-grid, turbines for thermal and hydroelectric power generation have large inertia forces. On the other hand, diesel synchronous generators and gas engine synchronous generators, which are expected to be utilized as main power sources in off-grid environments, are reciprocating engines, which are internal combustion engines, and thus do not have large rotating bodies like turbines and have smaller inertia forces than turbines.

Furthermore, a configuration in which the parameter values used in the virtual synchronous inverter control are varied (e.g., the inertia force constant is continually increased) simply to maximize the contribution to the stability of the power supply (system stability) may be considered; however, such a configuration would place an excessive load on the power supply device 12 (inverter 122), which may cause the power supply device 12 to stop operating. In contrast, in the present embodiment, by specifying a second parameter value that would not concentrate the load on the power supply device 12, the operation of the power supply device 12 can be continued, thus further improving the stability of the power supply.

Note that, in the present embodiment, the parameter values can be adjusted manually by the grid operator (i.e., the first parameter value used in the virtual synchronous inverter control can be changed to the second parameter value), and such parameter value adjustment can be performed, for example, in a case where a fluctuation in a predetermined grid frequency is detected in the power supply device 12, or at a timing indicated by the grid operator. In addition, the grid operator may specify the second parameter value in consideration of, for example, the balance between supply and demand for electric power (power supply and demand situation) or a decrease in the grid frequency.

The parameter value adjustment is performed, for example, by presenting a plurality of second parameter values to the grid operator and obtaining the second parameter value specified by the grid operator from among the plurality of second parameter values. According to this configuration, the grid operator can adjust the parameter values more easily than in the case of directly specifying the second parameter values (numerical values). In addition, in the case where one of the "large", "medium", and "small" buttons is specified as shown in FIG. 2 and FIG. 4 above, the grid operator can adjust the parameter value more intuitively.

Figure 6:
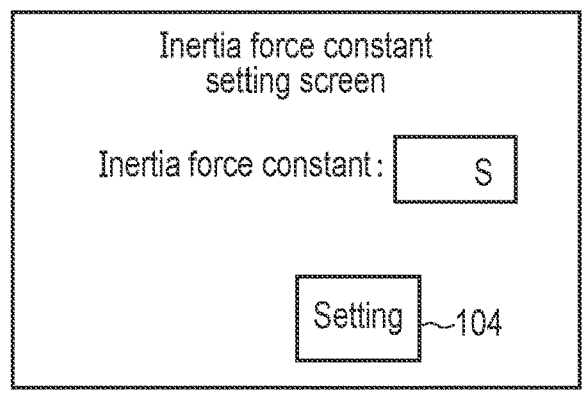
FIG. 6 shows another example of the inertia force constant setting screen.
Figure 7:
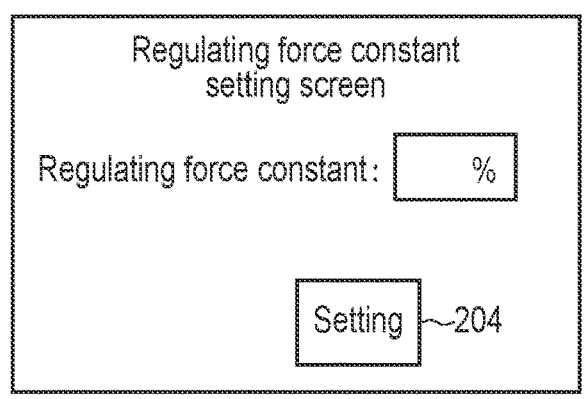
FIG. 7 shows another example of the regulating force constant setting screen.

Note that, in the present embodiment, for example, a plurality of second parameter values held in the parameter value table are presented and one second parameter value is selected from the plurality of second parameter values. However, a numerical value corresponding to the second parameter value may be directly specified by the grid operator. Specifically, for example, FIG. 6 shows another example of the inertia force constant setting screen displayed on the control panel device (an example different from FIG. 2), and the grid operator can specify (input) a numerical value representing the inertia force constant on such an inertia force constant setting screen. Similarly, for example, FIG. 7 shows another example of the regulating force constant setting screen (different from FIG. 4) displayed on the control panel device, and the grid operator can specify (input) a numerical value representing the regulating force constant on such an regulating force constant setting screen. According to this configuration, it is possible to specify a value other than the parameter value held in the parameter value table in advance as the second parameter value, which may allow the parameter value to be adjusted more appropriately.

Furthermore, in the present embodiment, it is explained that a plurality of power supply devices 12 are connected to a partial grid (microgrid) that is part of the power grid; however, in each of the plurality of power supply devices 12 connected to the partial grid, the parameter values can be adjusted independently. In this case, the second parameter value specified in one of the plurality of power supply devices 12 (hereinafter referred to as a first power supply device 12) and the second parameter value specified in a power supply device 12 different from the first power supply device 12 (hereinafter referred to as a second power supply device 12) may be different. According to such a configuration, the grid operator can appropriately adjust the load sharing with respect to the power supply device 12 in consideration of the remaining battery capacity, rating, etc., of each of the plurality of power supply devices 12.

Note that, although the description here assumes that the second parameter value specified for the first power supply device 12 is different from the second parameter value specified for the second power supply device 12, for example, the first power supply device 12 may be set as a master and the second power supply device 12 may be set as a slave, and the second parameter value specified for the first power supply device 12 may be used as the second parameter value for the second power supply device 12 (i.e., the adjustment result of the parameter value for the first power supply device 12 is applied to the second power supply device 12). In this case, for example, the plurality of power supply devices 12 (e.g., controllers 123), including the first and second power supply devices 12, are communicatively connected to each other, and the second parameter value specified for the first power supply device 12 is notified to the second power supply device 12 from the first power supply device 12 (i.e., the second parameter value is acquired by the second power supply device 12). According to this configuration, the parameter values used in the virtual synchronous inverter control executed in each of the plurality of power supply devices 12 can be efficiently adjusted.

Furthermore, in the power supply device 12, the virtual synchronous inverter control is executed based on an output current of the inverter 122 detected by the current sensor 124 and an output voltage of the inverter 122 detected by the voltage sensor 125 as described above; however, the output current and the output voltage may also be used to adjust the parameter values. Specifically, for example, as mentioned above, in a configuration where the inertia force constant is continuously increased focusing only on the stability of the power supply, for example, a situation where the operation of the power supply device 12 (inverter 122) stops may be assumed. However, to avoid such a situation, in the present embodiment, the parameter values are to be adjusted so that the rated output (power or current) of the power supply device 12 (inverter 122) is not exceeded. In this case, for example, a configuration may be considered in which an output voltage or an output voltage range (threshold value) that does not exceed the rated output is set in advance, and, of the plurality of second parameter values held in the parameter value table, the second parameter value for which the output current detected by the current sensor 124 or the output voltage detected by the voltage sensor 125 falls within the preset output voltage or output voltage range is presented to the grid operator.

Note that, if, for example, it is possible to narrow down the second parameter value to one parameter value for which the output current detected by the current sensor 124 or the output voltage detected by the voltage sensor 125 falls within the preset output voltage or output voltage range, a configuration in which the second parameter value is automatically acquired (i.e., the first parameter value is automatically changed to the second parameter value) may be considered. In other words, in the present embodiment, the parameter values used in the virtual synchronous inverter control may be manually adjusted by the grid operator, or may be automatically adjusted.

By the way, in the present embodiment, a case in which the parameter values are adjusted when transitioning from on-grid to off-grid (i.e., when off-grid) is mainly assumed; however, the parameter values may be adjusted in the same manner when on-grid. In such a case, the parameter value acquisition unit 126 has, for example, a parameter value table applicable to on-grid (hereinafter referred to as a first table) and a parameter value table applicable to off-grid (hereinafter referred to as a second table), and during on-grid, a second parameter value specified by the grid operator from among the plurality of second parameter values held in the first table is acquired, and, during off-grid, a second parameter value specified by the grid operator from among the second parameter values held in the second table is acquired. According to such a configuration, the parameter values can be appropriately adjusted both on-grid and off-grid.

Note that, since the parameter values (appropriate values) used for the virtual synchronous inverter control during on-grid operation and the parameter values (appropriate values) used for the virtual synchronous inverter control in an off-grid environment are considered to be different, the plurality of second parameter values held in the first table and the plurality of second parameter values held in the second table are to be set so that at least some of them are different.

The first and second tables used in adjusting the parameter values described above can be manually switched by the grid operator, for example; however, the power supply device 12 may have a configuration in which the first and second tables are automatically switched (hereinafter referred to as a first modified example of the present embodiment).

Figure 8:
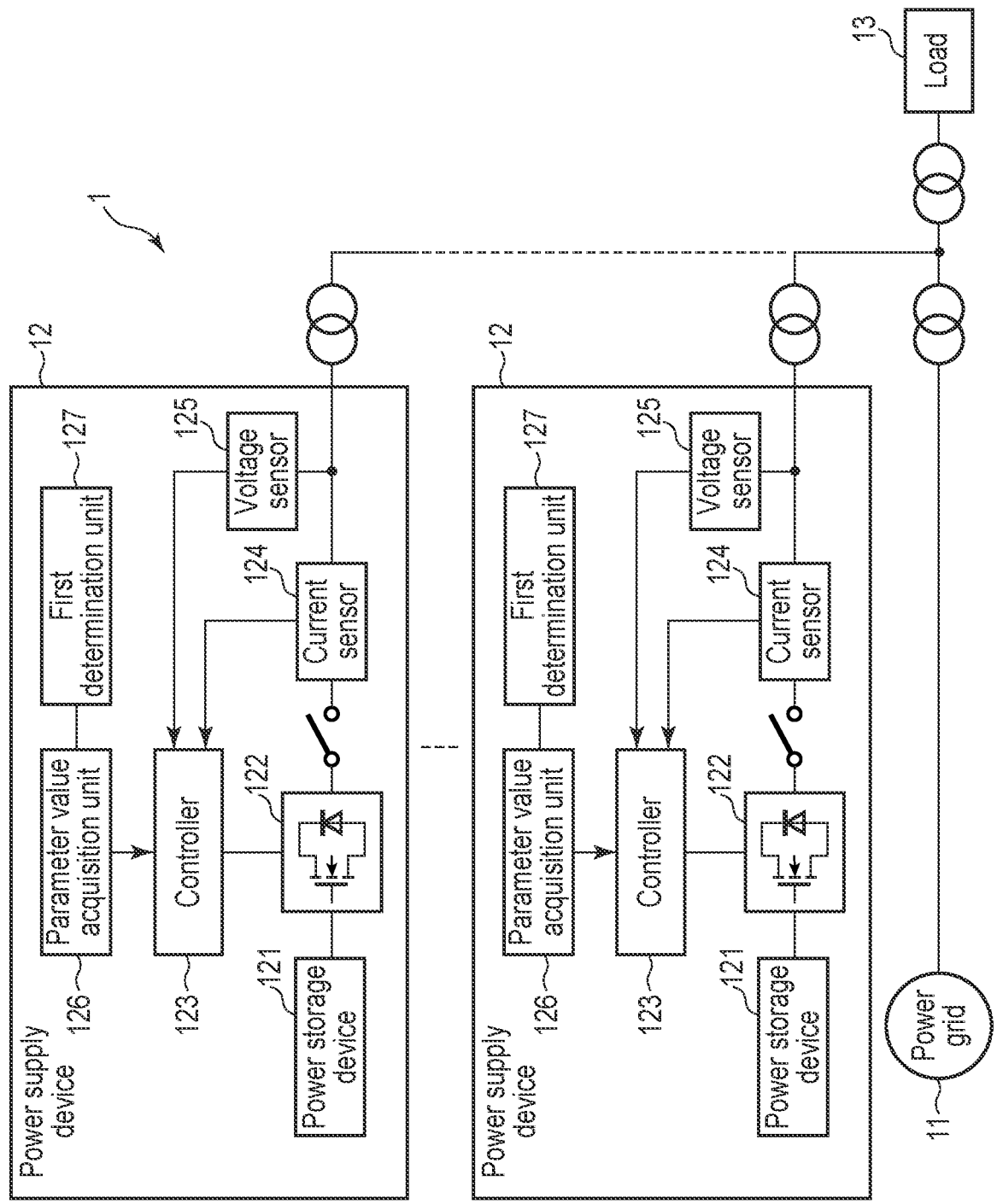
FIG. 8 illustrates a first modified example of the present embodiment.

Referring now to FIG. 8, a power supply device 12 according to the first modified example of the present embodiment will be described. Note that, in FIG. 8, parts similar to those in FIG. 1 are denoted by the same reference symbols, and a detailed explanation thereof is omitted.

As shown in FIG. 8, the power supply device 12 according to the first modified example of the present embodiment is further provided with a first determination unit 127. The first determination unit 127 determines whether or not the power supply device 12 is operated on-grid (i.e., whether or not the power supply device 12 is connected to a power grid 11) using, for example, a manual instruction for off-grid operation by a grid operator, or a sensor (detector) that detects the state of the switchgear described above. According to this configuration that includes the first determination unit 127, in a case where it is determined that the power supply device 12 is operated on-grid (i.e., the power supply device 12 is connected to the power grid 11), the parameter values are adjusted using the first table, and in a case where the power supply device 12 is operated off-grid (i.e., the power supply device 12 is not connected to the power grid 11), the parameter values can be adjusted using the second table.

In other words, in the first modified example of the present embodiment, the parameter value table can be automatically switched according to the determination result by the first determination unit 127 (i.e., the actual environment of the microgrid).

Furthermore, as shown in FIG. 9, the power system in the present embodiment may be configured to include an energy management system 20 (external server device) that implements centralized control over a plurality of power supply devices 12 (hereinafter referred to as a second modified example of the present embodiment). In FIG. 9, parts similar to those in FIG. 1 are denoted by the same reference symbols, and detailed explanations thereof are omitted.

In the second modified example of the present embodiment, the energy management system 20 is communicatively connected to each of the plurality of power supply devices 12 via a network and includes a decision unit 21 and a transmitter 22.

The decision unit 21 determines a second parameter value used to control the operation of an inverter 122 provided in each of the plurality of power supply devices 12. Note that the decision unit 21 may determine a second parameter value in response to an instruction of, for example, an administrator of the energy management system 20, or determine the second parameter value based on a state, etc., of the plurality of power supply devices 12 that are communicatively connected to the energy management system 20 (the plurality of power supply devices 12 subject to centralized control). The transmitter 22 transmits the second parameter value determined by the decision unit 21 to each of the plurality of power supply devices 12.

In this case, a parameter value acquisition unit 126 provided in each of the plurality of power supply devices 12 acquires the second parameter value transmitted from the energy management system 20, and a controller 123 provided in each of the plurality of power supply devices 12 can change the first parameter value to the second parameter value and control the operation of the inverter 122 (i.e., execute virtual synchronous inverter control).

Note that the second parameter values transmitted from the energy management system 20 to each of the plurality of power supply devices 12 in the second modified example of the present embodiment may be the same or different. The energy management system (transmitter 22) does not necessarily need to transmit the second parameter values to the plurality of power supply devices 12, but may be configured to transmit the second parameter values to at least one of the plurality of power supply devices 12.

Furthermore, the power supply device 12 connected to the energy management system 20 via a network may be configured to include a second determination unit 128 (hereinafter referred to as a third modified example of the present embodiment), as shown in FIG. 10. In FIG. 10, parts similar to those in FIG. 9 are denoted by the same reference symbols, and a detailed description thereof is omitted.

In the third modified example of the present embodiment, the second determination unit 128 detects whether or not there is communication with an energy management system 20 and determines whether or not a power supply device 12 is in a state where it can communicate with the energy management system 20. According to such a configuration including the second determination unit 128, in a case where it is determined that the power supply device 12 is in a state where it can communicate with the energy management system 20, the second parameter value is acquired from the energy management system 20 (i.e., the parameter value is adjusted in response to a command from the energy management system 20), and in a case where it is determined that the power supply device 12 is not in a state where it can communicate with the energy management system 20, the second parameter value specified by the grid operator is acquired as described above (i.e., the parameter value is adjusted using the parameter value table described above).

In other words, in the third modified example of the present embodiment, even in a case where a communication failure occurs between the power supply device 12 and the energy management system 20 when, for example, the power supply device 12 is being operated to acquire the second parameter values from the energy management system 20, the parameter values manually adjusted by the grid operator can be used to continue the operation of the power supply device 12.

Note that the description here assumes that in the case where the power supply device 12 is in a state of being able to communicate with the energy management system 20, it acquires the second parameter from the energy management system 20 (i.e., adjusts the parameter value in response to a command from the energy management system 20). However, in a case where the second parameter value is acquired from the energy management system 20 and the second parameter value specified by the grid operator is also acquired, priority may be given to the second parameter value specified by the grid operator (i.e., the operation of the inverter 122 is controlled by changing the first parameter value to the second parameter value specified by the grid operator).

As described above, the present embodiment can provide a power supply device, an energy management system, and a power system that can improve the stability of the power supply.

Note that, in the present embodiment, the parameter values used in the virtual synchronous inverter control are mainly described as including inertia force constants and regulating force constants. However, the parameter values may be one of the inertia force constants and regulating force constants. The present embodiment may also be applied to cases of adjusting parameter values that contribute to improving stability of power supplies other than the inertia force constant and regulating force constant used in the virtual synchronous inverter control.

The configurations described above in the present embodiment and the first to third modified examples of the present embodiment may be combined as appropriate, or may be partially omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiments, the following supplementary notes are further disclosed.

(1)

A power supply device connected to a power grid, including:
  an inverter;
  a control unit configured to control operation of the inverter using a first parameter value so as to simulate characteristics of a synchronous generator; and
  an acquisition unit configured to obtain a second parameter value different from the first parameter value, wherein
  the control unit is configured to control the operation of the inverter by changing the first parameter value to the acquired second parameter value.

(2)

The power supply device of item (1), wherein the control unit is configured to control the operation of the inverter based on output power and output voltage of the inverter.

(3)

The power supply device of item (1) or (2), wherein the acquisition unit is configured to acquire a second parameter value specified by the grid operator from among a plurality of second parameter values presented to the grid operator.

(4)

The power supply device of item (3), wherein the power supply device is connected to a partial grid that is part of the power grid, the acquisition unit is configured to:

include a first table holding a plurality of second parameter values applicable to on-grid where the partial grid is connected to the power grid and a second table holding a plurality of second parameter values applicable to off-grid where the partial grid is not connected to the power grid; and acquire a second parameter value specified by the grid operator from among the plurality of second parameter values held in the first or second table, and the plurality of second parameter values held in the first table and the plurality of second parameter values held in the second table are at least partially different.

(5)

The power supply device of item (4), further including a determination unit configured to determine whether or not the power supply device is connected to the off-grid, wherein the acquisition unit is configured to, in a case where it is determined that the power supply device is not connected to the off-grid, acquire a second parameter value specified by the grid operator from among the plurality of second parameter values held in the first table, and, in a case where it is determined that the power supply is connected to the off-grid, acquire a second parameter value specified by the grid operator from among the plurality of second parameter values held in the second table.

(6)

The power supply device of any one of items (1) to (5), wherein the second parameter value includes a numerical value specified by the grid operator.

(7)

The power supply device of any one of items (1) to (6), wherein the power supply device is connected to a partial grid that is part of the power grid, the partial grid is further connected to another power supply device different from the power supply device, and the first parameter value used to control the operation of the inverter provided in the another power supply device is changed to a third parameter value different from the second parameter value.

(8)

The power supply device of any one of items (1) to (7), wherein the power supply device is connected to a partial grid that is part of the power grid, the partial grid is further connected to another power supply device different from the power supply device, and in a case where the first parameter value is changed to the second parameter value, the first parameter value used to control the operation of the inverter provided in the another power supply device is changed to the second parameter value.

(9)

The power supply device of any one of items (1) to (8), wherein the acquisition unit is configured to acquire the second parameter value based on an output current and an output voltage of the inverter.

(10)

The power supply device of any one of items (1) to (9), wherein the acquisition unit is configured to acquire a second parameter value from an energy management system that is communicatively connected to the power supply device and perform centralized control over a plurality of power supply devices including the power supply device.

(11)

The power supply device of item (10), wherein the acquisition unit is configured to acquire a second parameter value specified by a grid operator in a case where the power supply device is not in a state where it can communicate with the energy management system.

(12)

The power supply device of item (10), wherein, the control unit is configured to, in a case where the acquisition unit acquires a second parameter value specified by a grid operator and acquires a second parameter value from the energy management system, change the first parameter value to the second parameter value specified by the grid operator and control operation of the inverter.

(13)

The power supply device of any one of items (1) to (12), wherein the first and second parameter values include at least one of an inertia force constant for simulating an inertia force of the synchronous generator and a regulating force constant for simulating a regulating power with respect to a fluctuating grid frequency.

(14)

An energy management system communicatively connected to each of a plurality of power supply devices including the power supply device of claim 1, and performing centralized control over the plurality of power supply devices, the energy management system including:

a decision unit configured to determine a second parameter value used to control operation of an inverter provided in at least one of the plurality of power supply devices; and a transmission unit configured to transmit the determined second parameter value to the power supply device, wherein the acquisition unit is configured to acquire the transmitted second parameter value.

(15)

A power system including a plurality of power supply devices including the power supply device of claim 1, and an energy management system that performs centralized control over the plurality of power supply devices, wherein the energy management system includes:

a decision unit configured to determine a second parameter value used to control operation of an inverter provided in at least one of the plurality of power supply devices; and a transmission unit configured to transmit the determined second parameter value to the power supply device, and the acquisition unit is configured to acquire the transmitted second parameter value.

What is claimed is:

1. A power supply device connected to a power grid, comprising:

an inverter;

a control unit configured to control operation of the inverter using a first parameter value so as to simulate characteristics of a synchronous generator; and an acquisition unit configured to obtain a second parameter value different from the first parameter value, wherein:
the control unit is configured to control the operation of the inverter by changing the first parameter value to the second parameter value,
the power supply device is connected to a partial grid that is part of the power grid,
the acquisition unit is configured to:
include a first table holding a plurality of second parameter values applicable to on-grid where the partial grid is connected to the power grid and a second table holding a plurality of second parameter values applicable to off-grid where the partial grid is not connected to the power grid; and
acquire, as the second parameter value, a second parameter value specified by a grid operator from among the plurality of second parameter values held in the first or second table, and
the plurality of second parameter values held in the first table and the plurality of second parameter values held in the second table are at least partially different.

2. The power supply device of claim 1, wherein the control unit is configured to control the operation of the inverter based on output power and output voltage of the inverter.

3. The power supply device of claim 1, further comprising a determination unit configured to determine whether or not the power supply device is connected to the off-grid,
wherein the acquisition unit is configured to, in a case where it is determined that the power supply device is not connected to the off-grid, acquire a second parameter value specified by the grid operator from among the plurality of second parameter values held in the first table, and, in a case where it is determined that the power supply is connected to the off-grid, acquire a second parameter value specified by the grid operator from among the plurality of second parameter values held in the second table.

4. The power supply device of claim 1, wherein the second parameter value includes a numerical value specified by the grid operator.

5. The power supply device of claim 1, wherein:
the partial grid is further connected to another power supply device different from the power supply device, and
the first parameter value used to control the operation of the inverter provided in the another power supply device is changed to a third parameter value different from the second parameter value.

6. The power supply device of claim 1, wherein:
the partial grid is further connected to another power supply device different from the power supply device, and
in a case where the first parameter value is changed to the second parameter value, the first parameter value used to control the operation of the inverter provided in the another power supply device is changed to the second parameter value.

7. The power supply device of claim 1, wherein the acquisition unit is configured to acquire the second parameter value based on an output current and an output voltage of the inverter.

8. The power supply device of claim 1, wherein the first and second parameter values include at least one of an inertia force constant for simulating an inertia force of the synchronous generator and a regulating force constant for simulating a regulating power with respect to a fluctuating grid frequency.

9. An energy management system communicatively connected to each of a plurality of power supply devices including the power supply device of claim 1, and performing centralized control over the plurality of power supply devices, the energy management system comprising:
a decision unit configured to determine a second parameter value used to control operation of an inverter provided in at least one of the plurality of power supply devices; and
a transmission unit configured to transmit the determined second parameter value to the power supply device,
wherein the acquisition unit is configured to acquire the transmitted second parameter value.

10. A power system comprising a plurality of power supply devices including the power supply device of claim 1, and an energy management system that performs centralized control over the plurality of power supply devices,
wherein:
the energy management system includes:
a decision unit configured to determine a second parameter value used to control operation of an inverter provided in at least one of the plurality of power supply devices; and
a transmission unit configured to transmit the determined second parameter value to the power supply device, and
the acquisition unit is configured to acquire the transmitted second parameter value.

11. A power supply device connected to a power grid, comprising:
an inverter;
a control unit configured to control operation of the inverter using a first parameter value so as to simulate characteristics of a synchronous generator; and
an acquisition unit configured to obtain a second parameter value different from the first parameter value,
wherein:
the control unit is configured to control the operation of the inverter by changing the first parameter value to the second parameter value, and
the acquisition unit is configured to:
acquire, as the second parameter value, a second parameter value from an energy management system that is communicatively connected to the power supply device and perform centralized control over a plurality of power supply devices including the power supply device, and
acquire, as the second parameter value, a second parameter value specified by a grid operator in a case where the power supply device is not in a state where it can communicate with the energy management system.

12. The power supply device of claim 11, wherein the control unit is configured to, in a case where the acquisition unit acquires a second parameter value specified by the grid operator and acquires a second parameter value from the energy management system, change the first parameter value to the second parameter value specified by the grid operator and control operation of the inverter.

* * * * *